US005772774A

United States Patent [19]
Chabot

[11] Patent Number: 5,772,774
[45] Date of Patent: Jun. 30, 1998

[54] EVAPORATOR FOR PRODUCING MAPLE SYRUP

[75] Inventor: Jean-Marie Chabot, St-Damien-de-Bellechasse, Canada

[73] Assignee: Les Équipements dÉrablière CDL Inc., St-Lazare, Canada

[21] Appl. No.: 785,504

[22] Filed: Jan. 17, 1997

[51] Int. Cl.[6] .............................. B01J 3/00; C13D 3/00; B01D 1/04; B01D 1/06
[52] U.S. Cl. ................................. 127/2; 127/9; 159/26.2; 159/27.1; 159/46
[58] Field of Search ........................... 127/2, 9; 159/26.2, 159/27.1, 46

[56] References Cited

U.S. PATENT DOCUMENTS

| | | | |
|---|---|---|---|
| 31,018 | 1/1861 | Hathaway et al. ........................... | 127/9 |
| 66,334 | 2/1867 | Hawley ........................................ | 127/9 |
| 884,272 | 4/1908 | Grimm ......................................... | 127/9 |
| 1,023,896 | 4/1912 | Voss ............................................. | 127/9 |
| 3,832,289 | 8/1974 | Kays et al. ............................... | 159/17.1 |
| 4,524,754 | 6/1985 | Schubert ................................. | 126/110 R |
| 4,796,602 | 1/1989 | Atkinson et al. ....................... | 126/59.5 |
| 4,819,615 | 4/1989 | Richardson et al. ........................ | 127/9 |
| 4,953,538 | 9/1990 | Richardson et al. ........................ | 127/9 |
| 5,049,199 | 9/1991 | Capen .......................................... | 127/9 |
| 5,275,666 | 1/1994 | Goodrich et al. ........................... | 127/9 |
| 5,389,209 | 2/1995 | Paquette ................................... | 203/14 |

*Primary Examiner*—Walter D. Griffin
*Assistant Examiner*—Patricia L. Hailey
*Attorney, Agent, or Firm*—Joseph W. Molasky & Associates

[57] ABSTRACT

An evaporator includes a maple sap evaporating pan in fluid communication with a maple syrup forming pan, a fire box in gas communication with gas circulating adjuncts, a flue stack and chimney and an auxiliary reservoir for pre-heating the sap prior to entering the maple sap evaporating pan. The auxiliary reservoir consists of a housing defined in the flue stack with an inlet for receiving cold sap. A series of horizontally spaced open end vertical tubes extends through the housing, each tube including a lower inlet receiving from the adjuncts flue gases that circulate through and heat the tubes and an upper outlet allowing the gases to exit through the chimney. Hence, cold sap received in the auxiliary reservoir is first heated by contact with the hot tubes.

10 Claims, 3 Drawing Sheets

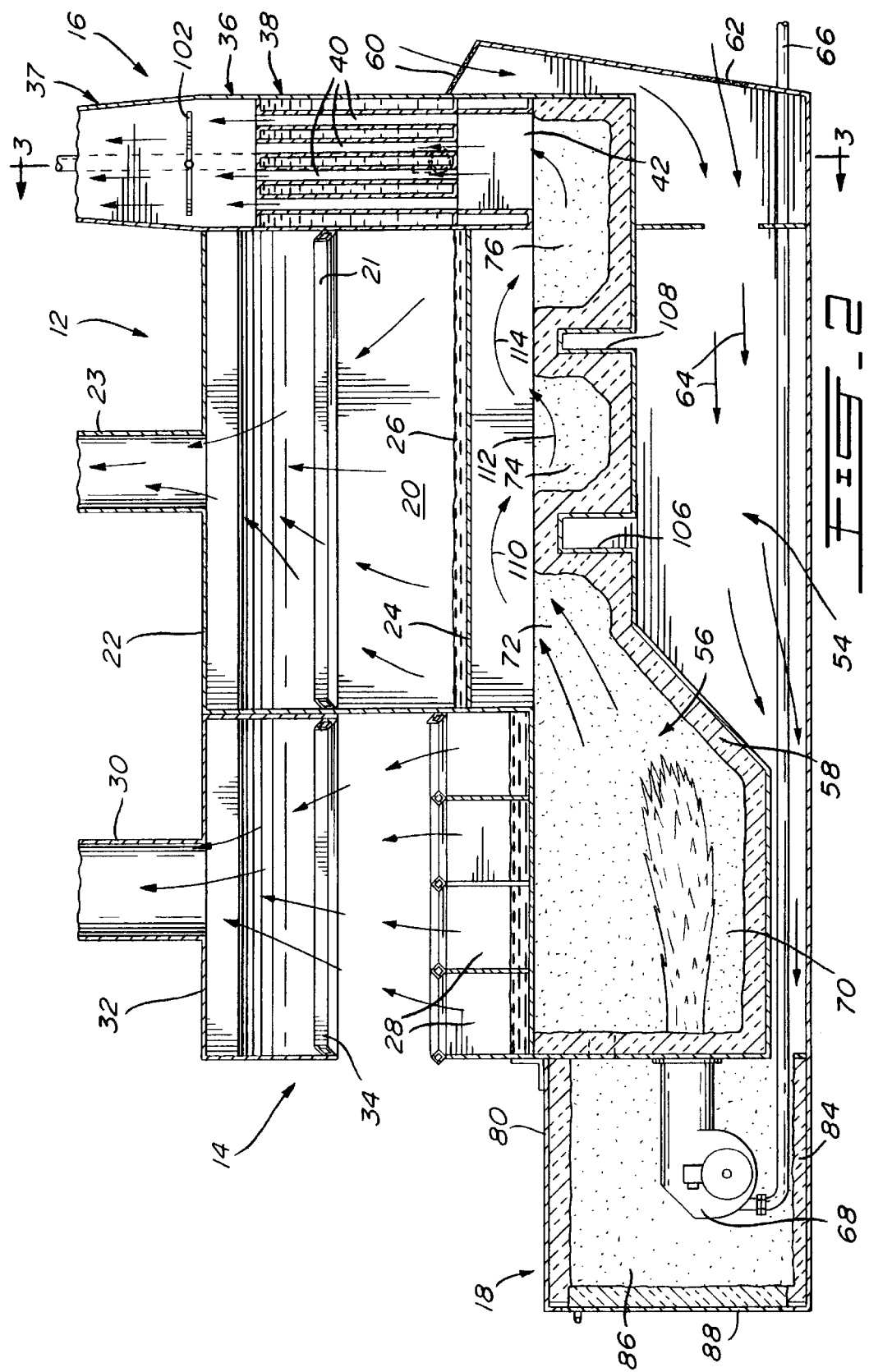

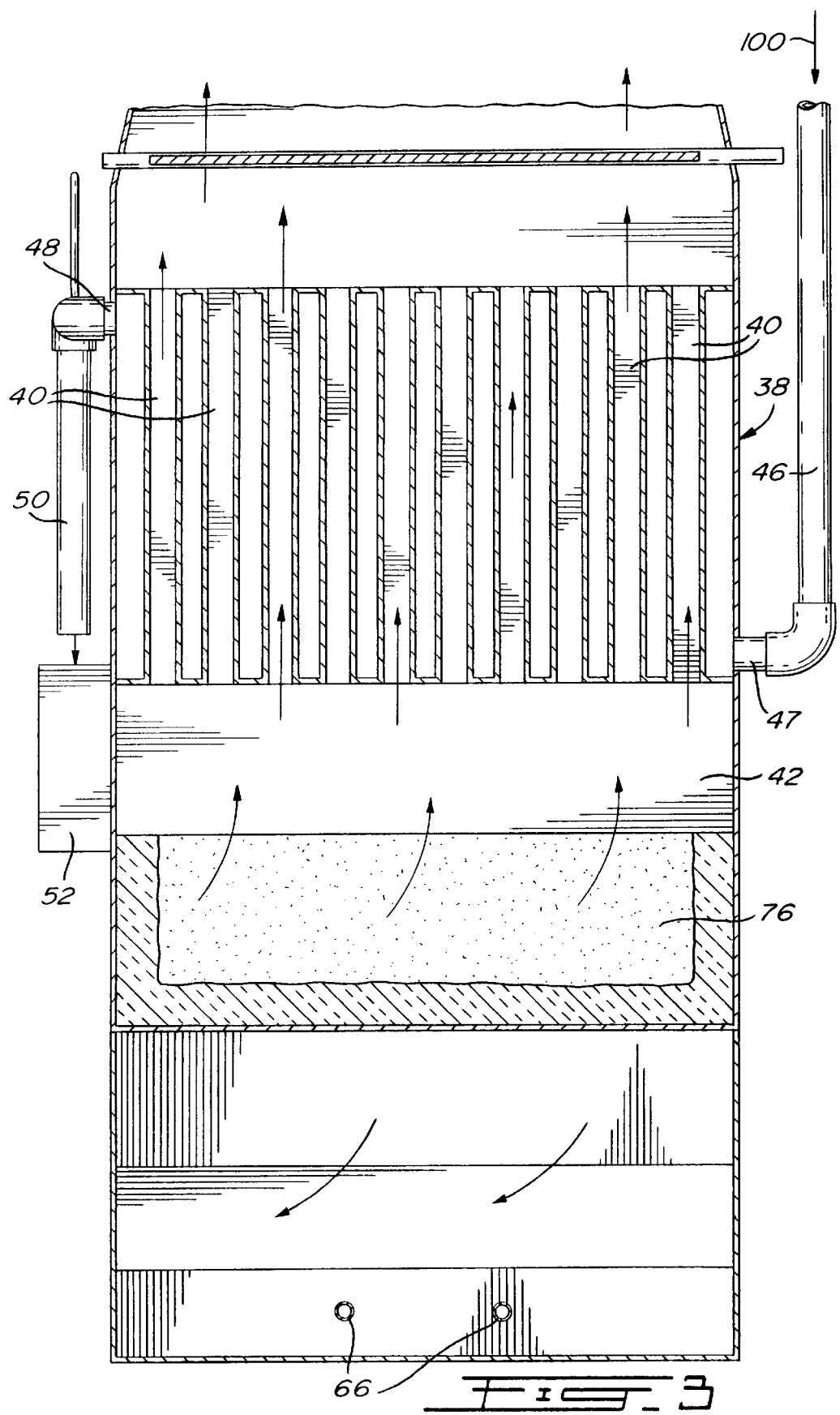

EVAPORATOR FOR PRODUCING MAPLE SYRUP

FIELD OF THE INVENTION

The present invention pertains to an evaporator for producing maple syrup and, more particularly, to the addition of an auxiliary reservoir to the evaporator for pre-heating cold sap prior to being introduced into maple sap evaporating pans of the evaporator.

BACKGROUND OF THE INVENTION

The evaporation of maple sap in the production of maple syrup is conventionnally made in horizontally extending pans provided with partitions. These pans are heated by the burning of wood logs or by an oil burner.

It has been found that about 90% of the energy contained in each liter of oil serves to transform sap into vapour. This percentage is only is about 50% for conventional wood burning evaporators.

OBJECTS AND STATEMENT OF THE INVENTION

It is an object of the present invention to optimize the use of the energy produced by an oil burning source.

This is achieved by directing the hot combustion gases through a heat exchanger formed of a series of vertical tubes in the flue stack of the evaporator before being evacuated through the chimney. The maple sap, or sap concentrate produced by a process known as "reverse osmosis", is received from a storage container towards a housing in the flue stack in which is located this heat exchanger. The maple sap, or sap concentrate, circulates around and in contact with the vertical tubes which are heated by the hot combustion gases and recuperates part of the energy contained in these gases so that it is pre-heated prior to reaching the conventional evaporating pan of the evaporator. This pre-heating enables to recuperate between 300° F. to 400° F. from the hot gases which would be otherwise lost. Indeed, the normal evacuation temperature of the gases from the chimney for such type of evaporator is between 850° F. and 900° F. With the present invention, gases are evacuated at about 450° F. to 475° F. Then, the energy efficiency reaches about 90% which is a technical maximum in oil combustion heating. Tests have revealed that, if the chimney gases are lower than 400° F., there is sap vapour condensation and creosotis forms in the chimney. So, a maximum combustion efficiency is reached for this type of process.

Another object of the present invention is to configure the evaporator so that the temperature of the oil and that of the air at the burner are about the same. This ensures immediate ignition, without fumes, and provides maximum temperature in the combustion fire box. In accordance with the present invention, the air and oil awaiting at the burner is pre-heated by their passage along the walls at the base of the fire box and of the evaporating pan. This feature increases the efficiency of the evaporator without any additional costs.

In one form of the invention, the combustion chamber is followed by two small decompression chambers which provide turbulence and reduce speed of the hot gases and maximum heat transfer to the evaporating pan before reaching the flue stack.

Other objects and further scope of applicability of the present invention will become apparent from the detailed description given hereinafter. It should be understood, however, that this detailed description, while indicating preferred embodiments of the invention, is given by way of illustration only, since various changes and modifications within the spirit and scope of the invention will become apparent to those skilled in the art.

BRIEF DESCRIPTION OF THE DRAWINGS

FIG. 2 is a elevational longitudinal cross-sectional view of the evaporator; and FIG. 3 is a cross-sectional view taken along lines 3—3 of FIG. 2.

DESCRIPTION OF PREFERRED EMBODIMENTS

Figure 1:
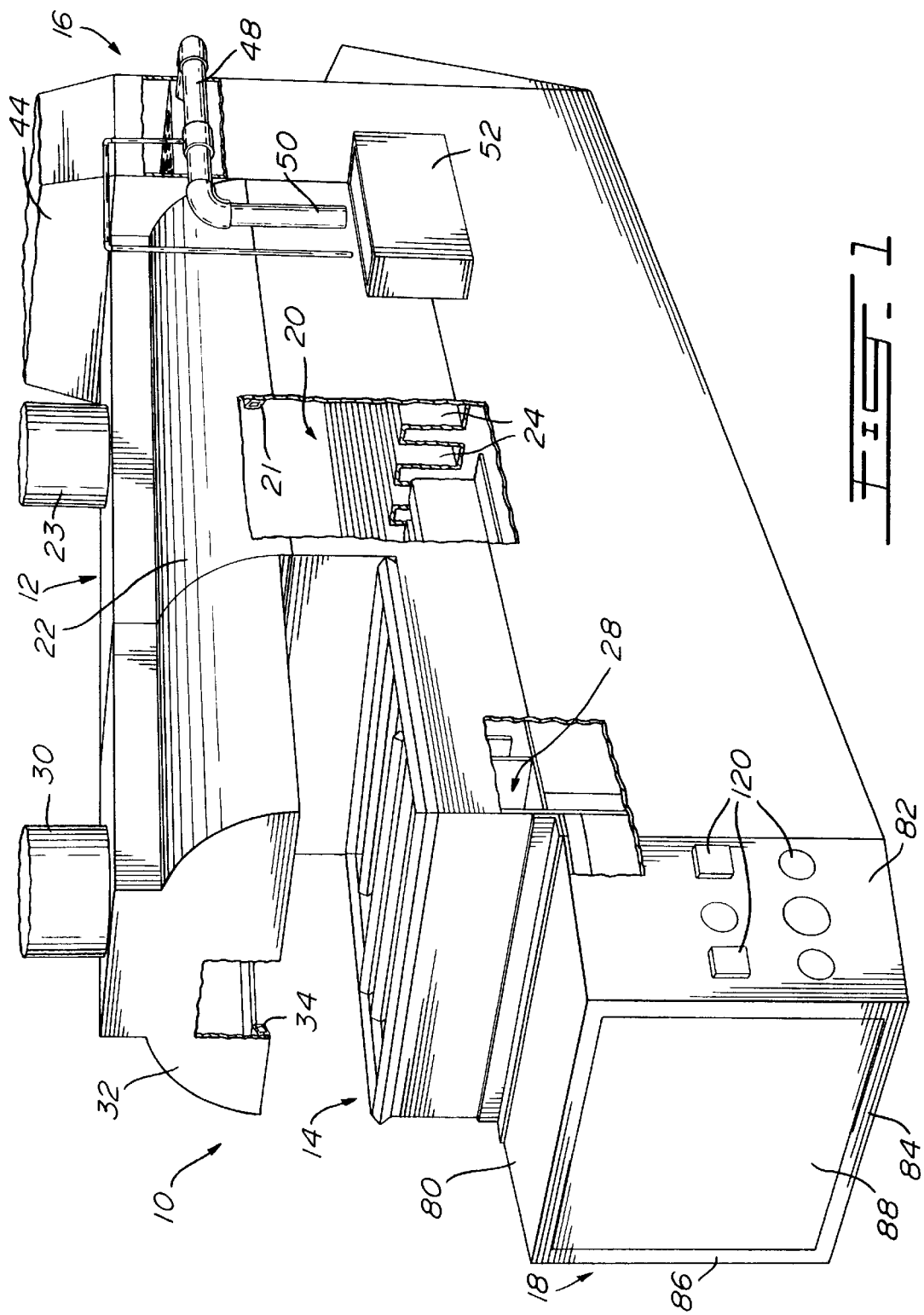
FIG. 1 is a perspective view, with parts broken away, showing an evaporator made in accordance with the present invention.

Referring to FIG. 1, there is shown an evaporator, generally denoted 10, which includes two main conventional sections consisting of a sap or maple sap evaporating section 12 and of a maple syrup forming section 14.

The evaporator 10 has, at one end, a chimney and flue stack section 16 and, at the other end, a cabinet 18 enclosing a heat source.

Referring also to FIG. 2, the maple sap evaporating section 12 consists of an enclosed chamber 20 formed of four side walls, each wall carrying a condensation collector 21, a hood 22 with a vapour outlet 23 and a floor which is formed of a series of longitudinal troughs 24 in which circulates a bed 26 of maple sap to be evaporated.

The conventional maple syrup forming section 14 consists of an open recipient formed of a series of transverse chambers 28 which are in successive fluid communication with one another. Distanced over this recipient lies a hood 32 with a chimney 30 for the evacuation of vapours. The walls of the hood are also equipped with a condensation collector 34.

Section 16 consists of a flue stack 36 and a chimney 37. The present invention is particularly concerned with the provision of auxiliary preheating reservoir or tank 38 in the flue stack portion of this section. Inside the flue stack is formed a housing which is traversed by a series of horizontally spaced vertically extending tubes 40 each having their lower end in communication with a lower chamber 42 and their upper end in open communication with the chimney 37. Cold sap is brought from a storage tank (not shown) into the flue stack housing by means of a conduit 46 (see FIG. 3) connected to the lower part of the housing through an inlet 47 while an outlet 48 directs pre-heated sap through a conduit 50 which discharges it in a collecting side pan 52 which is in fluid communication with the maple sap evaporating chamber 20.

Extending beneath sections 12, 14 and 16 extends a pair of housings 54 and 56 which are separated from one another by means of an insulated wall 58. Housing 54 has two inlets 60 and 62 allowing air to be directed (as indicated arrows 64) towards the cabinet 18. Also, extending in housing 54 is one or more conduits 66 for directing oil to a burner 68 inside the cabinet 18. Housing 56 is formed of a fire box 70 located beneath the pan chambers 28. The fire box is in communication with a series of gas circulating adjuncts 72, 74 and 76 lying under the throughs 24. Adjunct 76 is in fluid communication with the lower chamber 42 of the flue stack.

The cabinet 18 is formed of insulated panels 80, 82, 84, 86 and 88, the latter being removable.

In operation, cold sap received at 100 from a storage tank or from a reverse osmosis system is brought in the lower part of the auxiliary reservoir 38 by means of the conduit 46. The tubes 40 are heated by the passing through of the combustion gases from the lower chamber 42 of the flue stack. A damper 102 controls the exit of these gases. Rising in the preheating pan, sap is heated by contacting the tubes 40, exits at outlet 48 and is collected in the side pan 52. The latter, in fluid communication with the main evaporating pan, allows the pre-heated sap to circulate in and over the troughs 24. To provide gas turbulence beneath the troughs 24, the top wall 58 is formed of a series of transverse channels 106 and 108 causing the gases to move in the direction of arrows 110, 112 and 114 to prolong duration of the hot gases in contact with the bottom wall of the evaporating pan. Maple sap or sap concentrate is then passed onto the maple syrup forming pan section 14 through side conduits (not shown). In the chambers 28, the heat of the fire box causes additional and final evaporation of the maple sap to obtain maple syrup.

The evaporator is entirely made of stainless steel with parts preferably welded with argon. As can be seen in FIG. 1, the cabinet 18 is provided with various control instruments 120, including a pressure gage for controlling oil pressure in the burner, a dial for the pressure of the gases at the entrance of the chimney, a switch for interrupting the burner and others.

Although the invention has been described above with respect with one specific form, it will be evident to a person skilled in the art that it may be modified and refined in various ways. It is therefore wished to have it understood that the present invention should not be limited in scope, except by the terms of the following claims.

I claim:

1. In an evaporator having a maple sap evaporating pan in fluid communication with a maple syrup forming pan, a fire box in fluid communication with a set of horizontally disposed gas circulating adjuncts, a flue stack and chimney successively, the improvement comprising an auxiliary reservoir for preheating sap prior to entering said maple sap evaporating pan; said auxiliary reservoir consisting of a housing disposed in said flue stack and including an inlet for receiving cold sap in said housing; a series of spaced open end vertical tubes extending through said housing, each tube including a lower inlet receiving flue gases from a gas circulating adjunct disposed underneath the auxiliary reservoir for circulation through and heating said tubes and an upper outlet for exiting said bases to said chimney whereby cold sap received in said auxiliary reservoir is heated by contact with said heated tubes; said housing further including an outlet allowing heated sap to be directed to said maple sap evaporating pan.

2. In an evaporator as defined in claim 1, wherein said adjuncts are decompression chambers located beneath said maple sap evaporating pan.

3. In an evaporator as defined in claim 2, wherein said chambers include baffle means for creating turbulence in the flow of gases beneath said maple sap evaporating pan.

4. In an evaporator as defined in claim 3, wherein said maple sap evaporating pan is formed of a series of elongated troughs extending longitudinally of said pan and receiving heated sap thereon; said troughs defining, thereunder, complementary troughs extending in said chambers and allowing passage of gases therethrough.

5. In an evaporator as defined in claim 4, further comprising an enclosure adjacent said fire box to receive a fuel source therein, passageways beneath said fire box and said chambers allowing air and fuel conduits to said fuel source, whereby air and fuel are heated in said passageways prior to reaching said source.

6. In an evaporator as defined in claim 5, further comprising one or more air inlets to said passageways.

7. In an evaporator as defined in claim 6, further comprising air control means associated with one of said air inlets.

8. In an evaporator as defined in claim 1, further comprising pressure release means associated with said outlet directing heated sap to said maple sap evaporating pan.

9. In an evaporator as defined in claim 1, wherein said auxiliary reservoir includes a drain having one end connected to said housing and an opposite end connected to said maple sap evaporating pan.

10. In an evaporator as defined in claim 1, further comprising damper means mounted in said flue stack above said housing for controlling pressure of said gases.

* * * * *